July 22, 1958
K. THORNLEY
2,844,208
POTATO DIGGERS
Filed Feb. 27, 1956
2 Sheets-Sheet 1
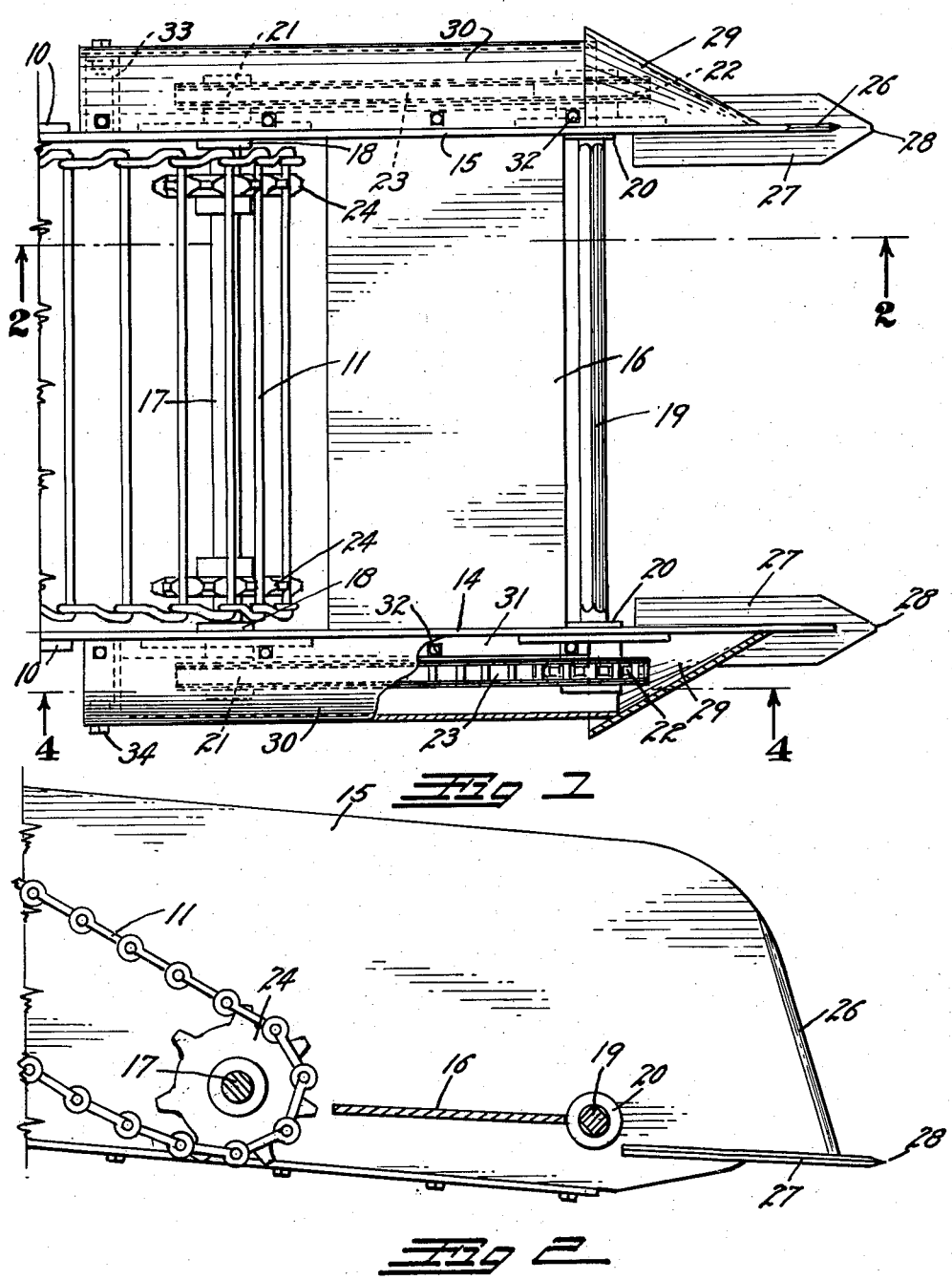
INVENTOR.
KENDELL THORNLEY
BY
ATTORNEY July 22, 1958  K. THORNLEY  2,844,208
POTATO DIGGERS
Filed Feb. 27, 1956  2 Sheets-Sheet 2
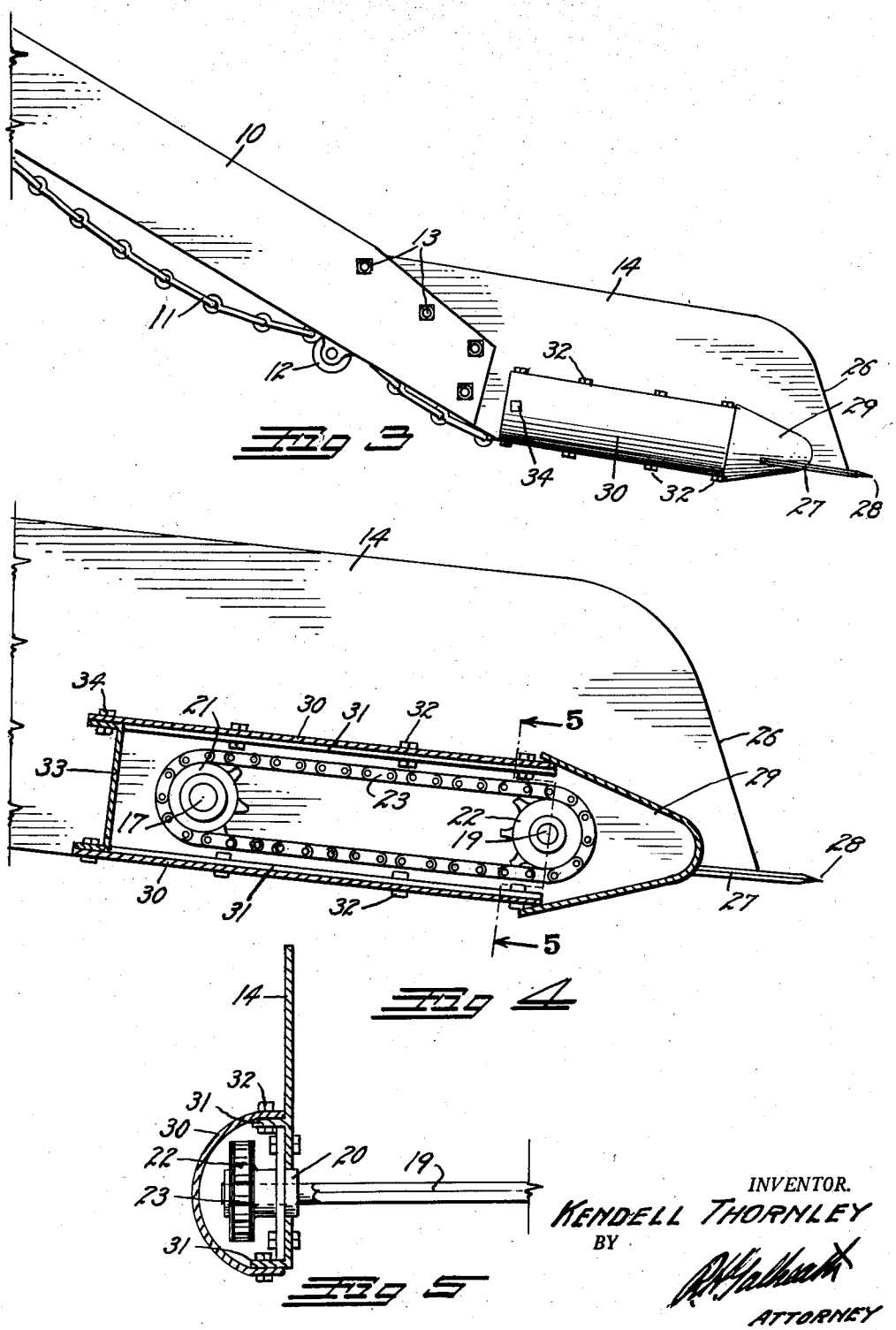
INVENTOR.
KENDELL THORNLEY
BY
ATTORNEY United States Patent Office 2,844,208
Patented July 22, 1958

2,844,208
POTATO DIGGERS
Kendell Thornley, Aberdeen, Idaho
Application February 27, 1956, Serial No. 567,991
1 Claim. (Cl. 171—89)

This invention relates to a potato harvester, and more particularly to a potato digging device for use on a potato harvesting machine. The principal object of the invention is to provide a potato digging device which when applied to a conventional harvester will travel along the row below the potatoes, and which will act to loosen the soil around the potatoes and loosen the potatoes from the soil and efficiently lift and deposit the potatoes upon a conventional harvester elevating chain without loss and without damage to the potatoes.

Another object of the invention is to provide a potato digging device which will move a rotating digging rod through the soil below the potatoes; and to provide means for supporting the rod so that a minimum of power will be required to move the rod along the potato row.

A further object is to provide a potato digging attachment for harvesters in which the power for rotating the digging rod will be efficiently obtained from the conventional elevating chain of the harvester without the use of an additional engine or additional power transmission equipment.

A still further object is to provide a potato digger of the rotating rod type with suction shoes which will serve to depress and maintain the rod at a uniform ground depth when in use.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved potato digging device, illustrating it applied to the forward extremity of an elevating chain of a conventional potato harvester;

Fig. 2 is a longitudinal section therethrough, taken on the line 2—2, Fig. 1;

Fig. 3 is a reduced scale, side view of the improved digging device, illustrating it mounted on the forward extermity of a conventional potato elevating chain;

Fig. 4 is an enlarged, detail section, taken on the line 4—4, Fig. 1; and

Fig. 5 is a similar detail section, taken on the line 5—5, Fig. 4.

In the drawing, the side elevator frame members of a conventional potato harvester elevator are illustrated at 10, the potato chain of the elevator at 11, and a lower chain guide roller at 12. The improved digging device is designed to be attached to the forward extremities of the side frame members 10 of the potato elevator.

The improved digger device comprises two elongated, vertical side plates 14 and 15. A platform plate 16 is welded to and extends between the side plates 14 and 15 and acts to maintain the latter in rigid, parallel, spaced-apart position. A chain shaft 17 is provided with conventional potato chain sprockets 24 journalled in suitable bearings 18 in the two side plates and extends therebetween. A digger shaft 19 also extends between the side plates 14 and 15 and is mounted in suitable bearings 20 therein. The digger shaft 19 is preferably square in cross-section, as illustrated, and is positioned in close proximity to and parallel with the forward edge of the platform plate 16.

Both of the shafts 17 and 19 extend through and project outwardly from the side plates. A drive chain sprocket 21 is mounted on each projecting extremity of the chain shaft 17 and a driven chain sprocket 22 is mounted on each projecting extremity of the digger shaft 19. A suitable transmission chain 23 extends between the sprockets 21 and 22 at each side of the digger.

To apply the improved digging device to a conventional digger, the usual digger blades and shoes are removed from the side frame members 10 and the two side plates 14 and 15 are bolted to the lower extremities of the frame members 10 by means of suitable attachment bolts 13, as shown in Fig. 3. The conventional elevator chain is lengthened, if necessary, and passed about the chain sprockets 24 of the shaft 17. Thus, the entire improved potato digger will be supported by and driven from the elevator of the conventional harvester.

The forward extremities of the side plates 14 and 15 are inclined forwardly and downwardly to provide a relatively sharp ground-penetrating edge 26 which extends forwardly of the digger shaft 19. Sharpened, pointed, elongated gauge plates 27 are welded to the lower edges of the forwardly extending portions of the side plates and extend forwardly from the latter to provide ground-engaging points 28.

Semi-conical, open-backed, tapered caps 29 are welded or otherwise secured to the outer faces of the side plates 14 and 15 forwardly of the digger shaft 19, there being one of the caps 29 surrounding each of the forward chain sprockets 22. A semi-cylindrical chain housing 30 is positioned about each of the transmission chains 23. The housings 30 are bolted to attachment flanges welded to or formed on the side plates 14 and 15 by means of suitable attachment bolts 32. The forward extremity of each housing 30 extends within and is closed by one of the caps 29. The rear extremity of each housing is closed by means of an end plate 33 welded or otherwise secured to the adjacent side plate, the housing being bolted to the end plate by means of suitable attachment bolts 34.

In use, the forward extremity of the elevator is lowered until the gauge plates 27 enter the ground and suck the digger to an elevation below the potatoes. As the harvester moves forwardly, the rotating digger shaft 19 loosens the soil around the potatoes and loosens the potatoes from the soil so that the platform plate 16 will slide easily beneath the loosened clods and potatoes and lift them to a position to be easily picked up by the potato chain 11 of the elevator. The chain 11 will then elevate the potatoes and shake the clods loose therefrom as the harvester moves forwardly and as is customary with potato harvesters.

The gauge plate 28 maintains the digger shaft 19 at the proper depth for efficient digging. The forward extremities of the gauge plates 27 and the forward edges of the side plates 14 and 15, and the surfaces of the caps 29 will scour in the soil to produce polished surfaces which will create very little frictional resistance as they move through the loosened soil. The digger shaft also creates very little resistance to the forward movement due to the fact that it is constantly rotating so that it will act to bore its way into the earth as it advances. Therefore, the improved digger requires but a minimum of power to move it through the earth below the potatoes.

No extra drive equipment is necessary, since the power for rotating the digger shaft is obtained directly from the traveling potato chain 11 with which all potato harvesting equipment is provided.

While the digger shaft has been illustrated as square, it could have any other suitable irregular cross-section suitable for boring into and agitating the earth. The platform plate is positioned closely adjacent the digger shaft so as to prevent the latter from being bent rearwardly should it encounter a rock or other obstruction.

The invention is more particularly designed for digging potatoes in non-scouring or stubborn soils. Potatoes are often planted in rotation with alfalfa. In such cases the conventional digger blades encounter alfalfa roots, and due to the soft mellow condition of the soil, these roots are not cut by the blade but are dragged over the blade, forming a root wedge ahead of the blade. Forcing the roots through the ground requires considerable waste of power and often lifts the potatoes to such a height that they roll to the sides of the row and are not picked up by the potato elevator.

In this invention the rotating digger bar cuts a path through the roots, and in cases where the roots cannot be cut, the rotating bar quickly rolls the roots onto the platform plate so that they do not accumulate to form a root wedge ahead of the digger bar.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

In a potato digger of the type having a potato elevating chain extending rearwardly and upwardly from a forwardly positioned sprocket shaft, means for loosening the potatoes from the soil and carrying them rearwardly to said elevating chain, comprising: a side plate extending forwardly from said sprocket shaft at each side of said chain; a potato-digging rod rotatably mounted in and extending between said side plates forwardly of and parallel to said sprocket shaft; a platform plate secured to and extending between said side plates rearwardly of said digging rod and forwardly of said sprocket shaft, said platform plate being flat and imperforate and lying in a plane of the axis of said digging rod; power transmission means on the exterior of said side plates transmitting rotation from both extremities of said sprocket shaft to both extremities of said digging rod, means enclosing said power transmission means including a semi-cylindrical member secured to the outer wall of each side plate and a semi-conical cap disposed at the forward end of each semi-cylindrical member and having the axial flat portion thereof secured to the corresponding side plate, and a flat gauge plate secured to the lower edge of the forward portion of each side plate and having a sharpened forward end, said gauge plates being substantially parallel with said platform plate and being disposed beneath the plane thereof and in advance of said digging rod.

References Cited in the file of this patent
UNITED STATES PATENTS

| | | |
|---|---|---|
| 2,325,704 | Passa | Aug. 3, 1943 |
| 2,355,229 | Miller | Aug. 8, 1944 |
| 2,441,244 | Kimball | May 11, 1948 |
| 2,747,354 | Bloser | May 29, 1956 |